United States Patent
Kim et al.

(10) Patent No.: US 8,456,432 B2
(45) Date of Patent: *Jun. 4, 2013

(54) ELECTRONIC DEVICE OF TOUCH INPUT TYPE

(75) Inventors: Jae-Kyung Kim, Ansan-si (KR); Yeon-Ho Son, Hwaseong-si (KR); Dong-Sun Park, Seoul (KR)

(73) Assignee: Samsung Electr-Mechanics Co., Ltd., Gyunggi-Do (KR)

(*) Notice: Subject to any disclaimer, the term of this patent is extended or adjusted under 35 U.S.C. 154(b) by 708 days.

This patent is subject to a terminal disclaimer.

(21) Appl. No.: 12/630,421

(22) Filed: Dec. 3, 2009

(65) Prior Publication Data

US 2010/0315355 A1 Dec. 16, 2010

(30) Foreign Application Priority Data

Jun. 15, 2009 (KR) .................. 10-2009-0052976

(51) Int. Cl.
*G06F 3/041* (2006.01)

(52) U.S. Cl.
USPC .......................................... 345/173

(58) Field of Classification Search
None
See application file for complete search history.

(56) References Cited

U.S. PATENT DOCUMENTS

| 7,292,227 B2 * | 11/2007 | Fukumoto et al. ........... 345/173 |
| 2005/0057527 A1 * | 3/2005 | Takenaka et al. ............ 345/173 |
| 2007/0080951 A1 * | 4/2007 | Maruyama et al. .......... 345/173 |
| 2010/0253485 A1 * | 10/2010 | Park et al. .................. 340/407.2 |
| 2010/0315354 A1 * | 12/2010 | Park et al. .................... 345/173 |

FOREIGN PATENT DOCUMENTS

| JP | 2004-094389 | 3/2004 |
| JP | 2004-258851 | 9/2004 |
| JP | 2008-123453 | 5/2008 |
| KR | 10-2002-0037771 A | 5/2002 |

OTHER PUBLICATIONS

Japanese Office Action, w/ English translation thereof, issued in Japanese Patent Application No. JP 2009-285104 dated Sep. 20, 2011.
Korean Office Action, with English Translation, issued in Korean Patent Application No. 10-2009-0052976, dated Jan. 14, 2011.
Yang Tae Hyun, "Development of small-sized tactile sensation module using elastic force and magnetic force for mobile devices," Advanced Institute of Science and Technology, 2008, with partial English Translation.

* cited by examiner

*Primary Examiner* — Adam R Giesy
(74) *Attorney, Agent, or Firm* — McDermott Will & Emery LLP

(57) ABSTRACT

A touch input-type electronic device is disclosed. In accordance with an embodiment of the present invention, the touch input-type electronic device includes a touchscreen panel, an actuator, which vibrates the touchscreen panel, a guide unit, which supports both ends of the actuator, such that vibration of the actuator can be transferred to the touchscreen panel, and supports the touchscreen panel, and a case, which supports the guide unit. Thus, the touch input-type electronic device in accordance with the present embodiment can provide an appealing sensory feel corresponding to a position that is pressed directly by the user, by vibrating the pressed position.

10 Claims, 9 Drawing Sheets

ELECTRONIC DEVICE OF TOUCH INPUT TYPE

CROSS-REFERENCE TO RELATED APPLICATIONS

This application claims the benefit of Korean Patent Application No. 10-2009-0052976, filed with the Korean Intellectual Property Office on Jun. 15, 2009, the disclosure of which is incorporated herein by reference in its entirety.

BACKGROUND

1. Technical Field

The present invention relates to a touch input-type electronic device.

2. Description of the Related Art

A touchscreen panel is a type of input device through which a user may press a particular area with a finger or a stylus pen to enter an input. The touchscreen panel may transfer an input signal corresponding to the pressed position to the electronic device on which the touchscreen panel is equipped.

Recently developed to make electronic devices, such as mobile phones, etc., provide a better appealing sensory feel to the user are devices capable of providing feedback in the form of vibration in response to the user's maneuvering of a touchscreen panel.

In such devices, the user may press a particular position on the touchscreen panel, at which feedback in the form of vibration may be transferred to the user. In this case, however, a large capacity driver is required to provide a greater feedback to the user.

However, mobile electronic devices may have a limit in increasing the size, and their battery capacities are also limited. Due to such difficulties, providing a better appealing sensory feel to the user has been inevitably restricted.

SUMMARY

The present invention provides a touch input-type electronic device that can provide an appealing sensory feel.

An aspect of the present invention provides a touch input-type electronic device that includes a touchscreen panel, an actuator, which vibrates the touchscreen panel, a guide unit, which supports both ends of the actuator, such that vibration of the actuator can be transferred to the touchscreen panel, and supports the touchscreen panel, and a case, which supports the guide unit.

There are a plurality of actuators. The guide unit can be formed in an annular shape so as to support a perimeter of the touchscreen panel. The plurality of actuators can be disposed symmetrically on either side of the guide unit.

The actuator is extended lengthwise, and the guide unit can support both ends of the actuator, in which the both ends of the actuator runs in a lengthwise direction. The guide unit can include a body that supports a perimeter of the touchscreen panel, in which the body is in an annular shape, and a supporting unit that is formed on a portion of the body so as to support a lower surface of the actuator. The supporting unit can be thinner than the body.

Also, the actuator can include a piezoelectric component, and a supporting member that is interposed between the piezoelectric component and the guide unit. The piezoelectric component can be a stacked piezoelectric component.

The touch input-type electronic device can further include a first vibration-proof unit that is interposed between the guide unit and the case so as to prevent vibration of the guide unit from being transferred to the case. The touch input-type electronic device can further include a display panel that is coupled to one surface of the touchscreen panel.

The touch input-type electronic device can further include a second vibration-proof unit that is interposed between the touchscreen panel and the display panel. The second vibration-proof unit can be interposed between the touchscreen panel and the display panel along a perimeter of the touchscreen panel.

Additional aspects and advantages of the present invention will be set forth in part in the description which follows, and in part will be obvious from the description, or may be learned by practice of the invention.

DETAILED DESCRIPTION

Figure 1:
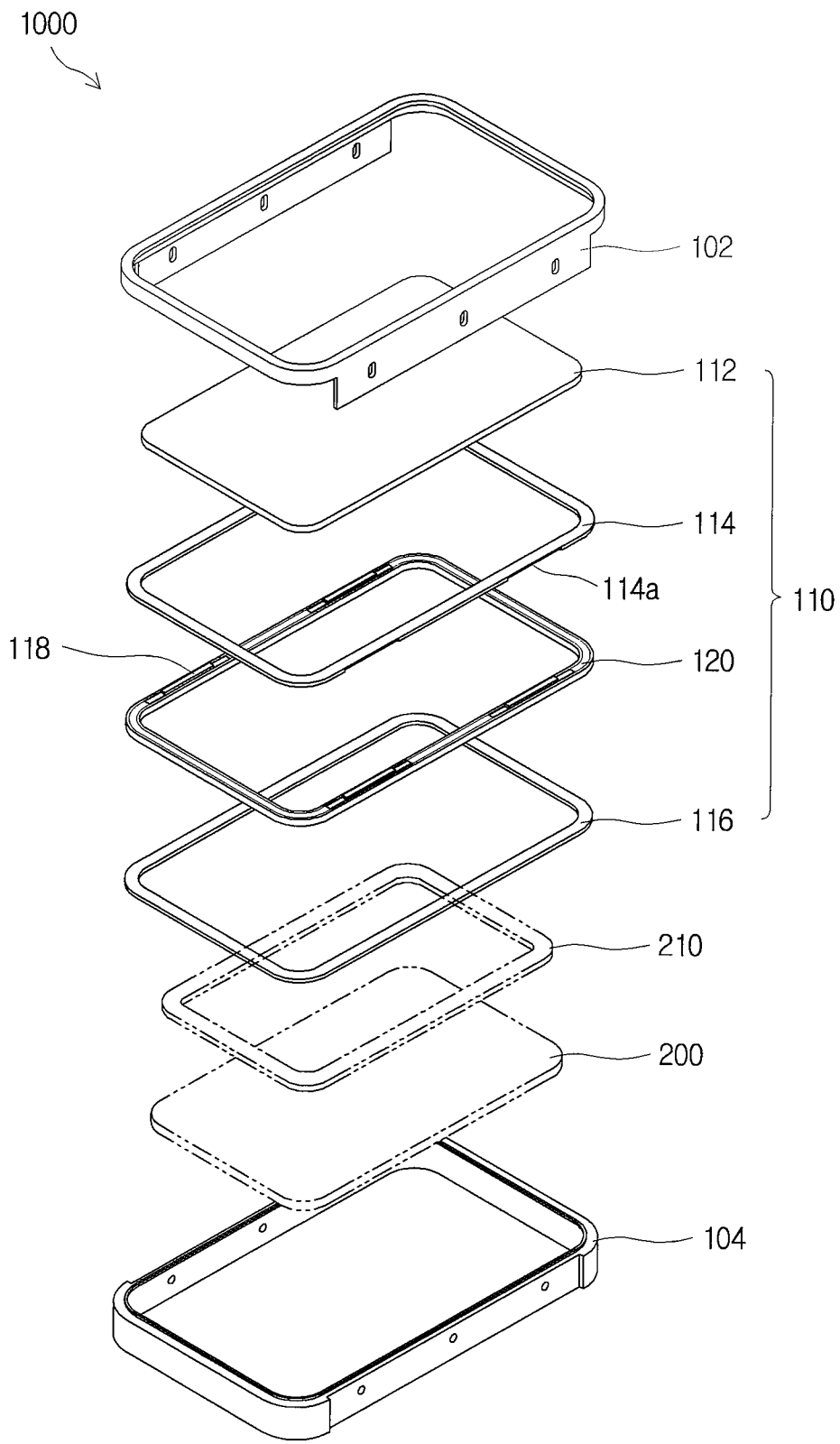
FIG. 1 is an exploded perspective view of a touch input-type electronic device in accordance with an embodiment of the present invention.

The features and advantages of this invention will become apparent through the below drawings and description.

A touch input-type electronic device according to certain embodiments of the present invention will be described below in more detail with reference to the accompanying drawings. Those components that are the same or are in correspondence are rendered the same reference numeral regardless of the figure number, and redundant descriptions are omitted.

FIG. 1 is an exploded perspective view of a touch input-type electronic device according to an embodiment of the present invention. As in the example shown in FIG. 1, a touch input-type electronic device 1000 according to an embodiment of the present invention can include a touchscreen panel 112, an actuator 118, which vibrates the touchscreen panel 112, a guide unit 120, which supports both ends of the actuator 118 and the touchscreen panel 112 such that vibration of the actuator 118 can be transferred to the touchscreen panel 112, and cases 102 and 104, which support the guide unit 120. Thus, the touch input-type electronic device in accordance with the present embodiment can provide an appealing sensory feel corresponding to a position that is pressed directly by the user, by vibrating the pressed position.

The touch input-type electronic device 1000 is an input device in which information can be inputted by a user's touch through the use of a touchscreen panel 112 employed as an input unit. The touch input-type electronic device 1000 can be implemented in, for example, a mobile phone, PDA (personal digital assistant), PMP (portable multimedia player), GPS navigation system, information kiosk, game console, and vending machine.

The touch input-type electronic device 1000 can also include a display panel 200. The display panel 200 is coupled to a lower surface of the touchscreen panel 112. The display panel 200 is an image output unit of the touch input-type electronic device 1000, and thus can display the image provided by the touch input-type electronic device 1000.

The case is a frame in which the components constituting the touch input-type electronic device 1000 can be housed. In accordance with an embodiment of the present invention, the case includes an upper case 102 and a lower case 104. In this embodiment, the upper case 102 covers an upper side of the touch input-type electronic device 1000, while the lower case 104 covers a lower side of the touch input-type electronic device 1000.

A touchscreen panel assembly 110 can include the touchscreen panel 112, first vibration-proof units 114 and 116, the guide unit 120, and an actuator 118. The touchscreen panel 112 is a device capable of perceiving whether or not the user has pressed a particular position, as well as the pressed position.

The touch input-type electronic device 1000 can include a controller (not shown) that controls the operations of the components constituting the touch input-type electronic device 1000. When a user presses a particular area on the touchscreen panel 112, the touchscreen panel 112 transmits a touch signal to the controller, and then the controller provides an operating signal to the actuator 118, which will be described later, allowing the actuator 118 to provide vibration to the touchscreen panel 112 that the user touches.

Therefore, the touchscreen panel 112 can perceive whether or not the user has touched, and the actuator 118 can vibrate the touchscreen panel 112 depending on whether or not the user touches the touchscreen panel 112.

Figure 2:
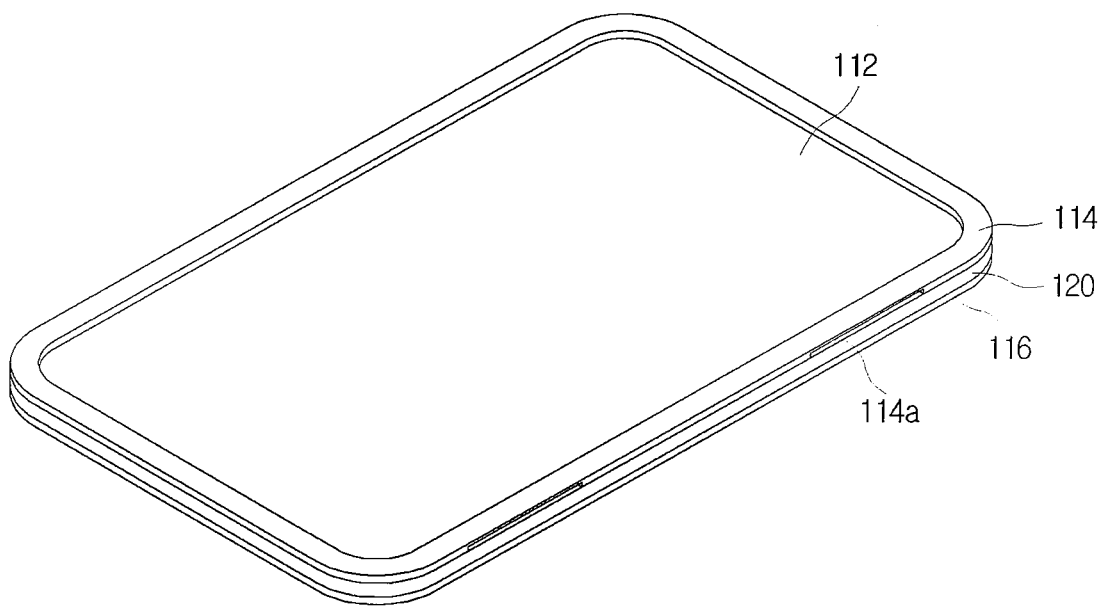
FIG. 2 is a perspective view illustrating a touchscreen panel assembly of a touch input-type electronic device in accordance with an embodiment of the present invention.
Figure 3:
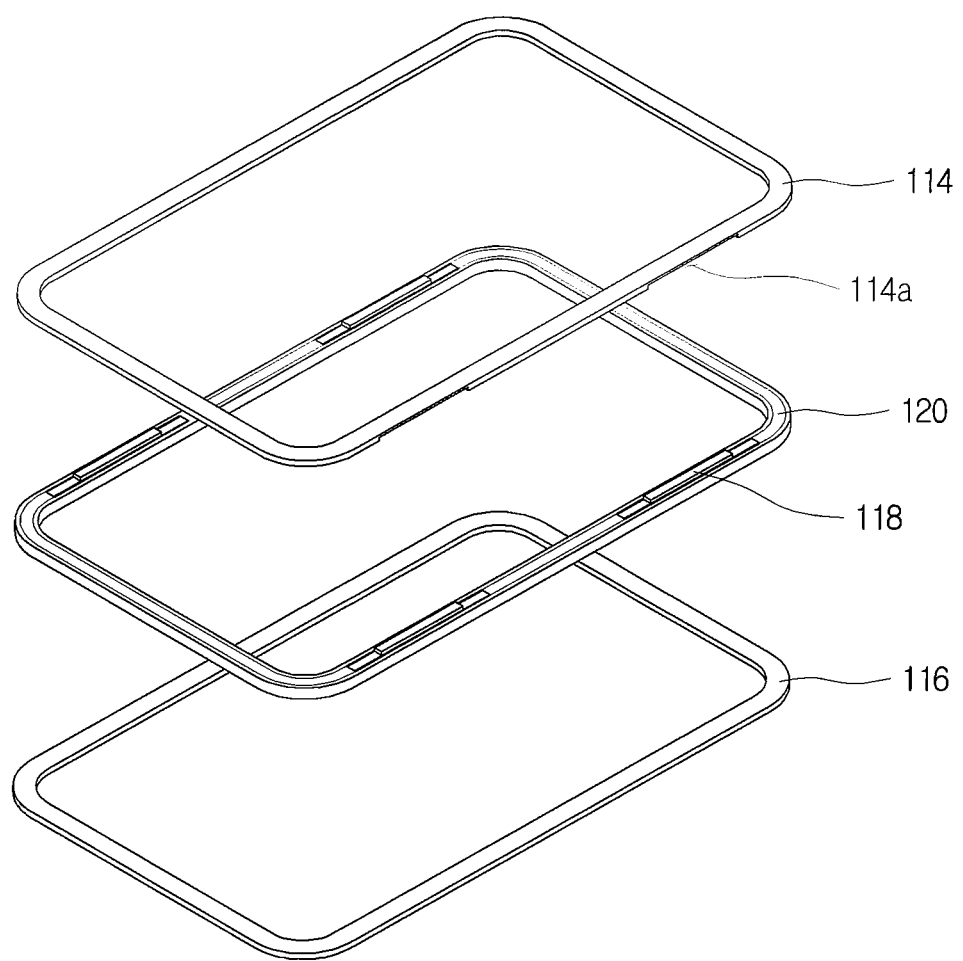
FIG. 3 is an exploded perspective view illustrating a touchscreen panel assembly of a touch input-type electronic device in accordance with an embodiment of the present invention.

FIG. 2 is a perspective view of a touchscreen panel assembly 110 in a touch input-type electronic device 1000 according to an embodiment of the present invention, and FIG. 3 is an exploded perspective view of a touchscreen panel assembly 110 in a touch input-type electronic device 1000 according to an embodiment of the present invention.

As in the example shown in FIGS. 2 and 3, the guide unit 120 is formed in the shape of a rectangular ring. The inner circumference of the guide unit 120 is coupled to the outer circumference of the touchscreen panel 112 while being in contact with the outer circumference of the touchscreen panel 112. Thus, the guide unit 120 can support the perimeter of the touchscreen panel 112.

A first vibration-proof unit can be coupled to an upper side and a lower side of the guide unit 120 so as to block the transfer of vibrations between the guide unit 120 and the case.

The first vibration-proof unit includes an upper first vibration-proof unit 114 and a lower first vibration-proof unit 116. The upper first vibration-proof unit 114 is formed in the shape of a rectangular ring, like the guide unit 120, and can cover an upper side of the guide unit 120. A groove 114*a* can be formed in a position corresponding to the position of the actuator 118 in a lower side of the upper first vibration-proof unit 114 so as to hold the actuator 118. The lower first vibration-proof unit 116 is formed in the shape of a rectangular ring, like the guide unit 120, and can cover a lower side of the guide unit 120.

Figure 4:
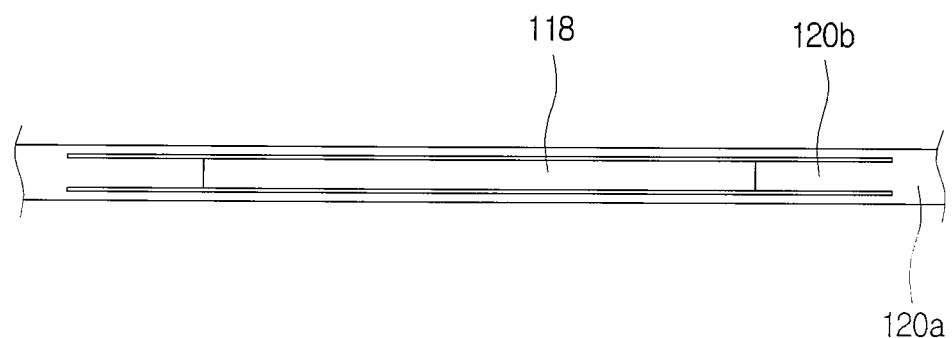
FIG. 4 is a plan view illustrating an actuator of a touch input-type electronic device in accordance with an embodiment of the present invention.
Figure 5:
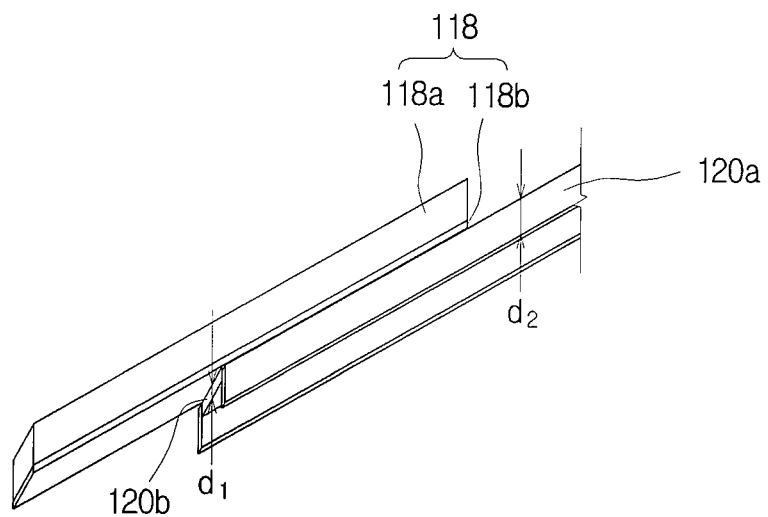
FIG. 5 is a detailed perspective view illustrating an actuator of a touch input-type electronic device in accordance with an embodiment of the present invention.

FIG. 4 is a plan view of an actuator 118 in a touch input-type electronic device 1000 according to an embodiment of the present invention, and FIG. 5 is a detailed perspective view of an actuator 118 in a touch input-type electronic device 1000 according to an embodiment of the present invention.

As in the example shown in FIGS. 4 and 5, the actuator 118 can include a piezoelectric component 118*a* and a supporting member 118*b*. The piezoelectric component 118*a* is formed in the shape of a bar extended lengthwise. The piezoelectric component 118*a* may be a stacked piezoelectric component so as to improve the driving force.

The supporting member 118*b* can be coupled to a lower surface of the piezoelectric component 118*a*. This arrangement may allow the piezoelectric component 118*a* coupled to the supporting member 118*b* to be transported easily during the manufacturing process. The supporting member 118*b* can be made of, for example, a ceramic material so as to support one surface of the piezoelectric component 118*a*, which is vulnerable to shocks, and thus can prevent the piezoelectric component 118*a* from being broken by external shocks applied to the exterior of the touch input-type electric device 1000.

If the polarization direction of the piezoelectric component 118*a* is upward or downward, the actuator 118 vibrates vertically because the piezoelectric component 118*a* is coupled to the supporting member 118*b*.

Therefore, the supporting member 118*b* can be made of a material that can be readily deformed and effectively transfer the vibration generated by the piezoelectric component 118*a* to the guide unit 120.

The guide unit 120 can include a body 120*a* and a supporting unit 120*b*. The body 120*a* is formed in an annular shape so as to support the perimeter of the touchscreen panel 112, while the supporting unit 120*b* is formed on a portion of the body 120*a* so as to support a lower surface of the actuator 118.

The supporting unit 120*b* is coupled to a lower surface of the supporting member 118*b*, and can be formed in the shape of a plate along the direction in which the actuator 118 is extended. The thickness d1 of the supporting unit 120*b* is smaller than the thickness d2 of the body 120*a*, and thus the supporting unit 120*b* can transfer the vibration generated by the actuator 118 to the body 120*a* by being deformed in accordance with the deformation of the actuator 118.

Therefore, when a user presses a particular area on the touchscreen panel 112, the vibration generated in the actuator 118 can be transferred to the touchscreen panel 112 through the support unit 120*b* and the body 120*a*, i.e., the guide unit 120, and thus the user can be provided with a corresponding feedback at the area that the user touches.

As in the example shown in FIG. 3, a total of 4 actuators 118 can be coupled to the guide unit 120, of which either side is coupled by two actuators 118. Therefore, the vibration generated from both sides of the touchscreen panel 112 can be transferred to the touchscreen panel 112 by way of the guide unit 120, and thus the user can be provided with a more reliable feedback at the area that the user touches.

Figure 6:
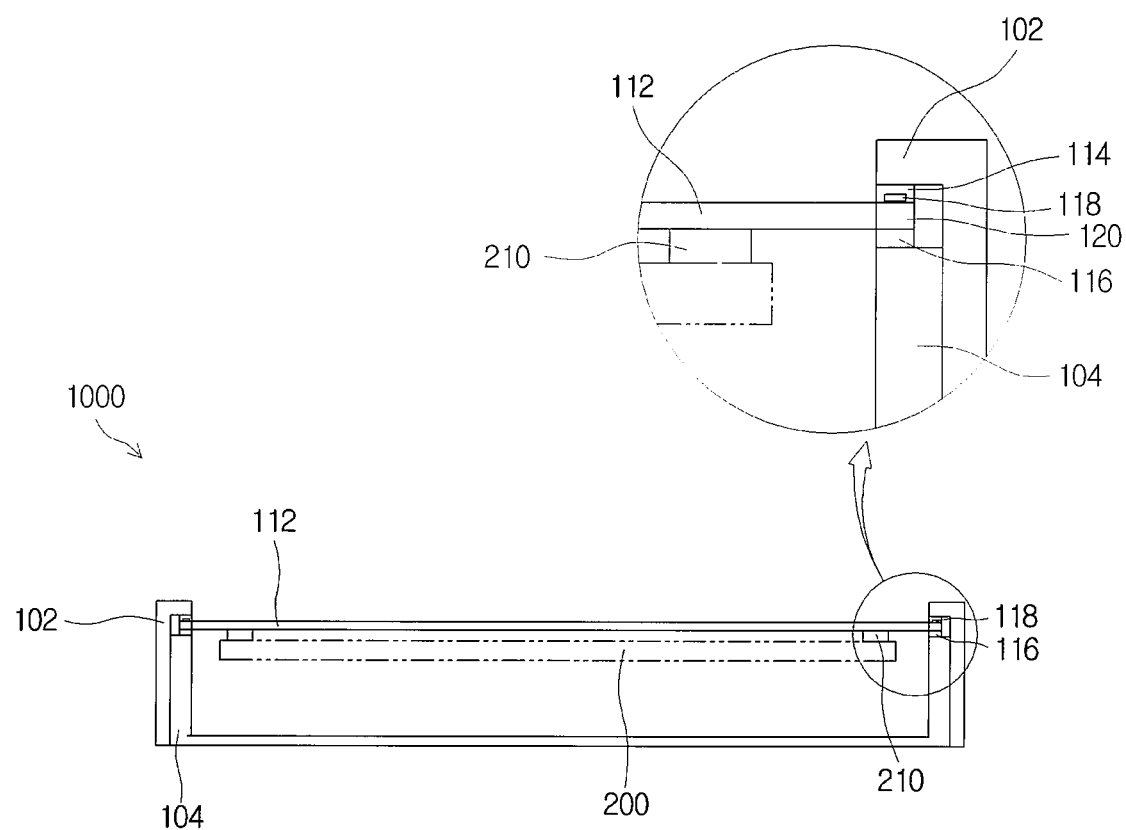
FIG. 6 is a cross-sectional view of a touch input-type electronic device in accordance with an embodiment of the present invention.

FIG. 6 is a cross-sectional view of a touch input-type electronic device 1000 according to an embodiment of the present invention. As in the example shown in FIG. 6, an upper first vibration-proof unit 114 is positioned between the guide unit 120 and the upper case 102, while a lower first vibration-proof unit 116 is positioned between the guide unit 120 and the lower case 104. Thus, the first vibration-proof units can prevent the vibration generated in the actuators 118 from being transferred to the cases, except the touchscreen panel 112.

A second vibration-proof unit 210 is positioned between the touchscreen panel 112 and the display panel 200 along the perimeter of the touchscreen panel 112, and thus can prevent vibrations, which are transferred from the actuator 118 to the touchscreen panel 112, from being transferred to the display panel 200 or electronic components inside the case.

Therefore, the first vibration-proof units and the second vibration-proof unit 210 can inhibit the transfer of vibrations generated by the actuator 118 to unnecessary parts, while transferring the vibrations to the touchscreen panel 112 that the user directly touches, so that more effective feedback may be provided to the user in the form of vibration.

Figure 7:
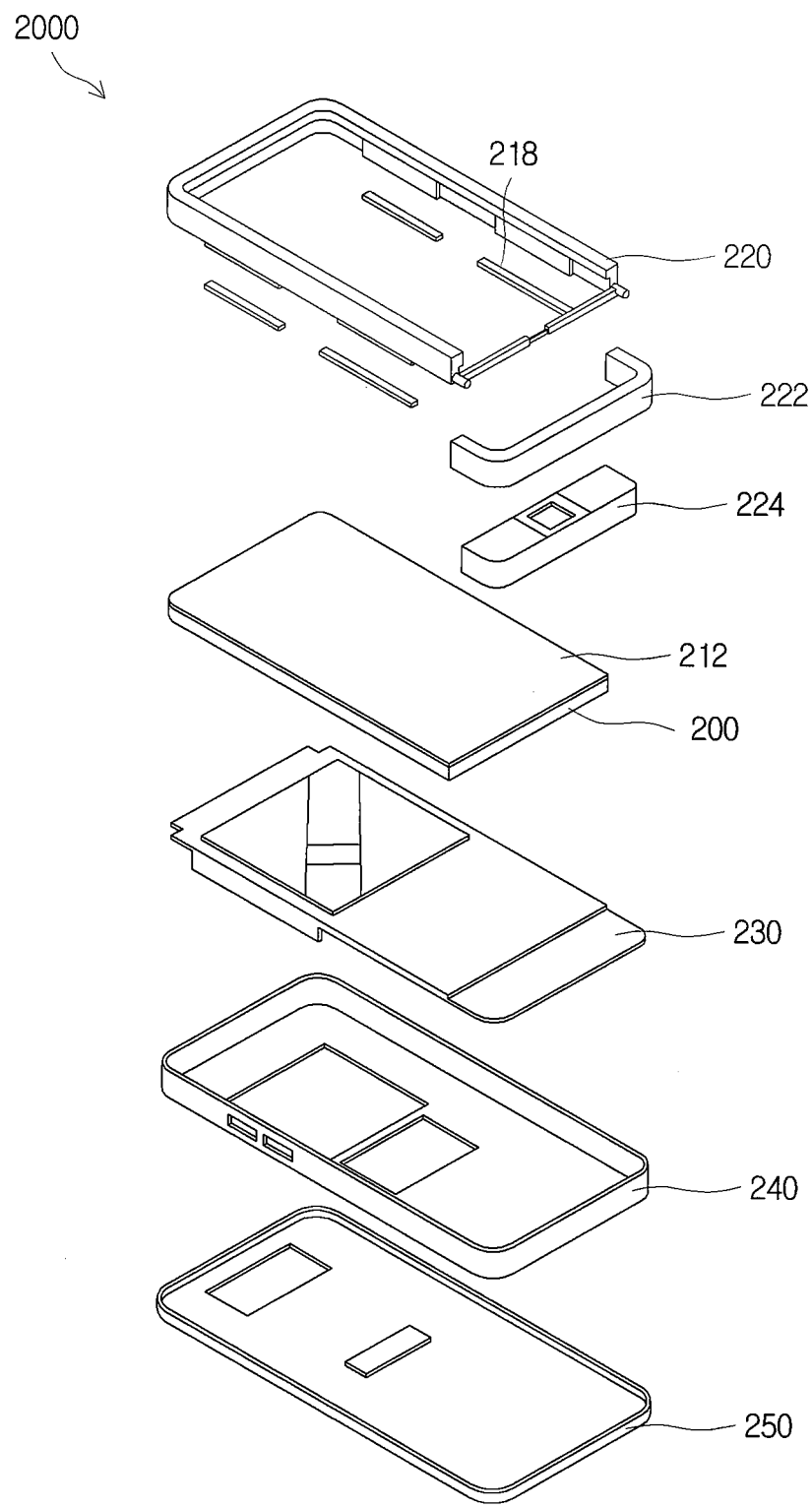
FIG. 7 is an exploded perspective view of a touch input-type electronic device in accordance with another embodiment of the present invention.

FIG. 7 is an exploded perspective view of a touch input-type electronic device 2000 according to another embodiment of the present invention. As in the example shown in FIG. 7, an actuator 218 of a touch input-type electronic device 2000 according to an embodiment of the present invention is coupled to an upper case 220, and thus can transfer vibration to a touchscreen panel 212.

The touch input-type electronic device 2000 according to this embodiment, like the touch input-type electronic device 1000 according to the previously described embodiment of the present invention, can be implemented in, for example, a mobile phone, PDA (personal digital assistant), PMP (portable multimedia player), GPS navigation system, information kiosk, game console, and vending machine.

The touchscreen panel 212 and a display panel 200 are coupled to each other, and can be supported by a frame 230. Each of them has a rectangular shape.

The upper case 220 has a rectangular ring-shape corresponding to the shape of the touchscreen panel 212. The upper case 220 covers the perimeter of the touchscreen panel 212 and supports the outer circumference of the touchscreen panel 212.

A keypad 224 is coupled to an end in the longitudinal direction of the touchscreen panel 212, and an input device, in which information can be inputted by a user's touch, is coupled to the keypad 224. The keypad 224 is supported by the frame 230, and the perimeter of the keypad 224 is supported by a keypad cover 222.

A lower case 240 covers a lower side of the touch input-type electronic device 2000 and thus provides a space in which the components constituting the touch input-type electronic device 2000 can be housed. A lower side of the lower case 240 is covered by a battery cover 250.

Figure 8:
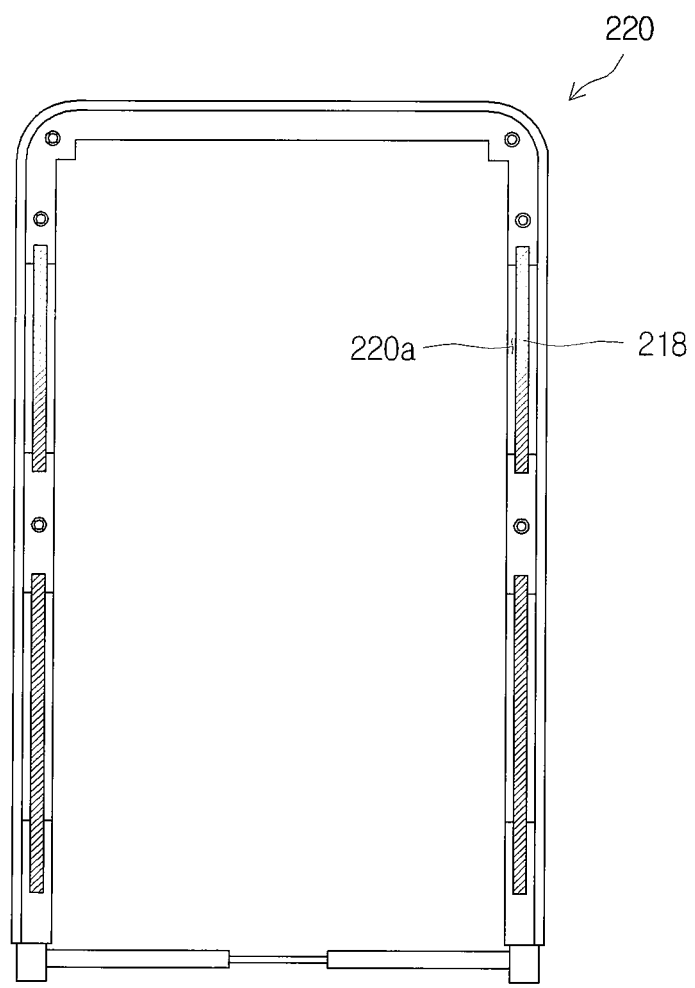
FIG. 8 is a bottom view illustrating an upper case of a touch input-type electronic device in accordance with another embodiment of the present invention.

FIG. 8 is a bottom view illustrating an upper case 220 of a touch input-type electronic device 2000 according to another embodiment of the present invention. As in the example shown in FIGS. 7 and 8, a total of 4 actuators 218 can be coupled to the upper case 220, of which either side is symmetrically coupled by two actuators 218.

Figure 9:
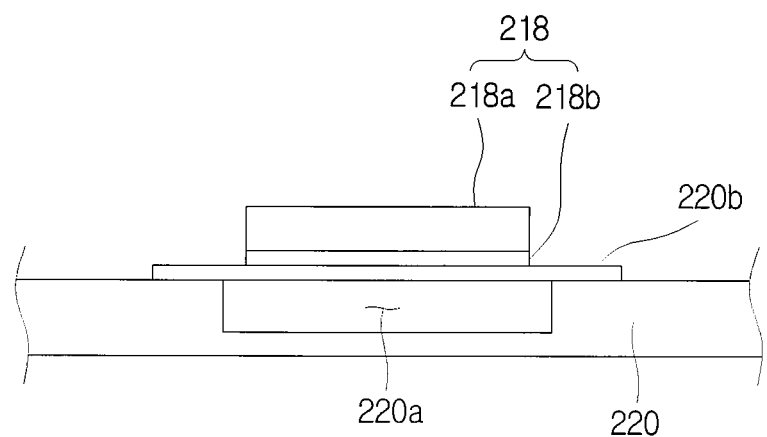
FIG. 9 is a side view illustrating a portion of an upper case of a touch input-type electronic device in accordance with another embodiment of the present invention.

FIG. 9 is a side view illustrating a portion of an upper case 220 of a touch input-type electronic device 2000 according to another embodiment of the present invention. As shown in FIGS. 8 and 9, the upper case 220 according to this embodiment supports both ends of the actuator 218.

A groove 220a can be formed on a lower surface of the upper case 220 where the actuator 218 is coupled so as not to obstruct the vibration of the actuator 218. The groove 220a has a longitudinally extended shape corresponding to the actuator 218 that is extended lengthwise.

A supporting unit 220b can be formed on an upper side of the groove 220a. The supporting unit 220b can be formed in the shape of a plate, where the supporting unit 220b is thinner than the upper case 220. The supporting unit 220b can transfer the vibration generated in the actuator 218 to the upper case 220 by being deformed in accordance with the deformation of the actuator 218.

An actuator 218 can be coupled to the supporting unit 220b. The actuator 218 can include a piezoelectric component 218a and a supporting member 218b. The piezoelectric component 218a has a longitudinally extended shape, and may be a stacked piezoelectric component so as to provide a better driving force.

The piezoelectric component 218a coupled to the supporting member 218b may further improve shock resistance. With this arrangement, an individual piezoelectric component 218a can be transported easily, so that the process of putting the parts together may be improved.

Therefore, the upper case 220 according to the present embodiment, like a guide unit according to the previously described embodiment of the present invention, can transfer the vibration generated in the actuator 218 to the touchscreen panel 212, so that the vibration can be more effectively transferred to the area that the user directly touches.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

As such, many embodiments other than those set forth above can be found in the appended claims.

What is claimed is:

1. A touch input-type electronic device comprising:
   a touchscreen panel;
   an actuator configured to vibrate the touchscreen panel;
   a guide unit supporting both ends of the actuator, such that vibration of the actuator can be transferred to the touchscreen panel, and supporting the touchscreen panel; and
   a case supporting the guide unit, wherein
   the guide unit comprises:
   a body supporting a perimeter of the touchscreen panel, the body being in an annular shape; and
   a supporting unit formed on a portion of the body so as to support a lower surface of the actuator,
   the supporting unit is formed in a plate shape,
   the supporting unit is thinner than the body, and
   the lower surface of the actuator is in contact with an upper surface of the supporting unit totally.

2. The touch input-type electronic device of claim 1, wherein there are a plurality of actuators.

3. The touch input-type electronic device of claim 2, wherein the plurality of actuators are disposed symmetrically on either side of the guide unit.

4. The touch input-type electronic device of claim 1, wherein:
   the actuator is extended lengthwise; and
   the guide unit supports both ends of the actuator, the both ends of the actuator running in a lengthwise direction.

5. The touch input-type electronic device of claim 1, wherein the actuator comprises:
   a piezoelectric component; and
   a supporting member interposed between the piezoelectric component and the guide unit.

6. The touch input-type electronic device of claim 5, wherein the piezoelectric component is a stacked piezoelectric component.

7. The touch input-type electronic device of claim 1, further comprising a first vibration-proof unit interposed between the guide unit and the case so as to prevent vibration of the guide unit from being transferred to the case.

8. The touch input-type electronic device of claim 1, further comprising a display panel coupled to one surface of the touchscreen panel.

9. The touch input-type electronic device of claim 8, further comprising a second vibration-proof unit interposed between the touchscreen panel and the display panel.

10. The touch input-type electronic device of claim 9, wherein the second vibration-proof unit is interposed between the touchscreen panel and the display panel along a perimeter of the touchscreen panel.

\* \* \* \* \*

UNITED STATES PATENT AND TRADEMARK OFFICE
CERTIFICATE OF CORRECTION

PATENT NO. : 8,456,432 B2  
APPLICATION NO. : 12/630421  
DATED : June 4, 2013  
INVENTOR(S) : Jae-Kyung Kim et al.

Page 1 of 1

It is certified that error appears in the above-identified patent and that said Letters Patent is hereby corrected as shown below:

On the title page of the patent, under section "(73) Assignee", please change

"Samsung Electr-Mechanics Co., Ltd., Gyunggi-Do (KR)" to

-- Samsung Electro-Mechanics Co., Ltd., Gyunggi-Do (KR) --

Signed and Sealed this  
First Day of April, 2014

Michelle K. Lee  
*Deputy Director of the United States Patent and Trademark Office*